(12) United States Patent
Oberle et al.

(10) Patent No.: US 8,365,630 B2
(45) Date of Patent: Feb. 5, 2013

(54) TRANSMISSION DRIVE UNIT WITH A ZERO AXIAL BACKLASH BEARING FASTENING, IN PARTICULAR FOR ADJUSTING A MOVABLE PART IN A MOTOR VEHICLE

(75) Inventors: Hans-Juergen Oberle, Rastatt (DE); Peter Mueller, Lautenbach (DE); Andreas Lienig, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 1349 days.

(21) Appl. No.: 11/994,799

(22) PCT Filed: Aug. 14, 2006

(86) PCT No.: PCT/EP2006/065282
§ 371 (c)(1),
(2), (4) Date: Jan. 4, 2008

(87) PCT Pub. No.: WO2007/036387
PCT Pub. Date: Apr. 5, 2007

(65) Prior Publication Data
US 2008/0163712 A1     Jul. 10, 2008

(30) Foreign Application Priority Data
Sep. 28, 2005   (DE) .......................... 10 2005 046 354

(51) Int. Cl.
*F16H 1/16* (2006.01)
*F16H 57/02* (2012.01)

(52) U.S. Cl. ........... 74/425; 74/89.23; 74/409; 74/606 R

(58) Field of Classification Search ................. 74/89.23, 74/89.14, 424, 425, 606 R; 384/275, 276, 384/280, 296; 254/103
See application file for complete search history.

(56) References Cited

U.S. PATENT DOCUMENTS

| 2,441,640 | A | * | 5/1948 | Lounsbury | 74/606 R |
| 2,781,191 | A | * | 2/1957 | Pickles | 49/139 |
| 3,202,004 | A | * | 8/1965 | Field | 476/16 |
| 3,416,386 | A | * | 12/1968 | Pickles | 74/89.37 |
| 3,463,030 | A | * | 8/1969 | Nuccel | 74/409 |
| 3,665,786 | A | * | 5/1972 | Kobayashi | 74/625 |
| 3,811,335 | A | * | 5/1974 | Hunsberger | 74/409 |
| 3,848,477 | A | * | 11/1974 | Giandinoto et al. | 74/425 |
| 4,774,848 | A | * | 10/1988 | Zupancic | 74/425 |
| 4,790,202 | A | * | 12/1988 | Hayashi et al. | 74/396 |
| 5,213,000 | A | * | 5/1993 | Saya et al. | 74/425 |
| 5,214,978 | A | * | 6/1993 | Ersoy et al. | 74/493 |

(Continued)

FOREIGN PATENT DOCUMENTS

DE   199 2617        8/1968
DE   3815356 A   *  11/1989

(Continued)

*Primary Examiner* — Richard W Ridley
*Assistant Examiner* — Thomas Diaz
(74) *Attorney, Agent, or Firm* — Michael J. Striker

(57) ABSTRACT

A transmission drive unit (10) for adjusting a movable part (58) in a motor vehicle includes a drive element (18), which is capable of being driven by a drive assembly (42), and which is rotatably supported in a support tube (14) via at least one end shield (28). The drive element (18) has a first axial stop (23), which bears against a first axial support surface (21) of the support tube (14), and a second axial stop (35), which rests against a second axial support surface (27) of the end shield (28). The end shield (28) is pressed against the second axial stop (35) of the drive element (18) via a material deformation of the support tube (14).

6 Claims, 3 Drawing Sheets

U.S. PATENT DOCUMENTS

| | | | |
|---|---|---|---|
| 5,373,753 A * | 12/1994 | Toyomasa | 74/396 |
| 5,823,499 A * | 10/1998 | Ito et al. | 248/429 |
| 6,639,335 B1 * | 10/2003 | Lauk et al. | 310/89 |
| 6,763,738 B1 * | 7/2004 | Tsutsui et al. | 74/388 PS |
| 6,849,977 B2 * | 2/2005 | Walther et al. | 310/90 |
| 6,867,516 B2 * | 3/2005 | Frey et al. | 310/51 |
| 7,034,421 B1 | 4/2006 | Walther | |

FOREIGN PATENT DOCUMENTS

| | | |
|---|---|---|
| DE | 195 37 503 | 3/1997 |
| DE | 198 54 535 | 6/2000 |
| JP | 57-139723 | 9/1982 |
| JP | 62-21752 | 2/1987 |
| JP | 62-165081 | 7/1987 |
| JP | 08-340656 | 12/1996 |
| JP | 10-285861 | 10/1998 |
| JP | 2000-312454 | 11/2000 |
| JP | 2002-10564 | 1/2002 |
| JP | 2002-317815 | 10/2002 |
| WO | 02/19502 | 3/2002 |
| WO | 2004/040735 | 5/2004 |
| WO | 2006/032584 | 3/2006 |

* cited by examiner

TRANSMISSION DRIVE UNIT WITH A ZERO AXIAL BACKLASH BEARING FASTENING, IN PARTICULAR FOR ADJUSTING A MOVABLE PART IN A MOTOR VEHICLE

BACKGROUND OF THE INVENTION

The present invention relates to a transmission drive unit with a zero backlash bearing fastening, in particular for adjusting a movable part in a motor vehicle.

Publication DE 198 545 35 A1 makes known a drive device for a windshield wiping system of a motor vehicle, which includes a housing and an armature shaft with a worm rotatably supported therein. Using an axial force-generating device, a sliding wedge element is displaced radially to the armature shaft in order to compensate for the axial play of the armature shaft. The displacement force of the sliding wedge element is applied by a preloaded spring element that presses the sliding wedge element radially against a stop of the armature shaft, thereby displacing the armature shaft axially until the axial play is compensated for. When a strong load is placed on the armature shaft by a driven wheel, an axial force is produced, via which the armature shaft is pressed against the sliding wedge element. The sliding wedge element is pressed back radially away from the armature shaft against the spring element. As a result of this strong, sustained load on the spring element, its service life, i.e., its elastic properties, is/are reduced, and the axial play of the armature shaft is therefore no longer compensated for. The armature shaft therefore moves back and forth axially when loaded, which can result in unpleasant "clacking" sounds being produced. Nor is a sliding wedge element of this type suited for the backlash-free axial support of a drive element in a largely closed support tube that does not have a cover and that is installed radially to the bearing axis.

SUMMARY OF THE INVENTION

The inventive transmission drive unit and its inventive manufacturing method have the advantage that, by locating the drive wheel of the spindle in a support tube, a separate standardized assembly is created that is independent of a transmission housing or the drive assembly. By eliminating a conventional transmission housing, with which the driven element of the drive assembly and the drive wheel of the spindle are both located in a closed housing, the transmission drive unit, as a modular system, may be adapted—very flexibly—to different attachment devices of customer-specific applications. The same preassembled assembly may therefore always be used with the standard support tube, and the mechanical interface for attaching the transmission drive unit to the body or a part to be adjusted may be easily varied afterward using a customer-specific receiving module for the attachment device. By deforming the wall material of the support tube, the end shield may be held in a defined position very reliably once the axial play has been eliminated. The material deformation of the support tube makes it possible to redirect very strong axial forces that act on the drive element onto the support tube.

When the jacket tube is pressed radially inwardly, the end shield may be fixed in position axially—practically independently of the axial contact pressure—to eliminate longitudinal play. The attachment of the end shield is not affected by the production-related tolerances of the components to be supported, thereby making it possible to reliably prevent bearing play. In addition, an additional component is not required to fix the bearing in position, thereby making the drive unit more cost-favorable to manufacture.

It is advantageous to press the wall material of the jacket region radially inward in such a manner that an axial end face is formed as an undercut that bears against the end shield. Depending on the axial forces that are produced, it is therefore possible to vary the width and depth of the undercut via the strength and duration of the caulking force, without the need to modify the design. When the undercut forms an end face that is oriented nearly perpendicularly to the spindle, it is only undergoes shear stress. As a result, the material deformation cannot be reshaped back in the radial direction even when strong axial forces are applied. Axial play is therefore effectively prevented.

By locating the jacket regions in the region of the support tube with the maximum diameter, several material deformations may be easily carried out and their dimensions may be more easily varied. In addition, a more reliable attachment of the end shield is attained via the maximum radial distance to the drive axis.

When the wall material of the support tube is pressed radially inward such that a tab with a free end is formed, this free end may securely fix the end shield in position axially.

In terms of process engineering, the wall material may be reshaped in a particularly favorable manner using a caulking tool that acts radially on the jacket surface of the support tube. A form-fit connection may therefore be created that fixes the end shield in position axially and, possibly in the circumferential direction.

To minimize friction, the drive element may be supported—particularly favorably—axially on the end shield nearly at a single point. For this purpose, the axial end of the drive element—in particular, a rotary spindle—includes a bulged surface as the second axial stop, which is designed, e.g., as an integrated ball.

For this purpose—in a variation of the present invention—the end shield includes a stop face made of a harder material than is the rest of the end shield. This hard stop face may be realized, e.g., by integrating a thrust washer that has been manufactured separately.

To use a spindle that extends through the support tube and out of both sides, the drive element may be easily supported axially using a circumferential stop collar that is integrally formed with the end shield. The bearing collar is located radially as close as possible to the axial hole of the end shield through which the drive element and/or the shaft are guided.

For radial support, the end shield includes a sleeve-shaped, inner jacket surface against which the drive element bears radially. As a result, the axial and radial support may be advantageously realized using one component.

The inventive support of the drive element is suited, in particular, for use with a drive wheel that is supported on a shaft in a rotatable or non-rotatable manner. The shaft may bear directly against the end shield, or it may bear indirectly against the end shield via the drive wheel supported thereon.

When the transmission drive unit is designed as a spindle drive, with which the shaft is a spindle, particularly high axial forces occur. They may be absorbed—particularly advantageously—via the inventive material deformation of the support tube in order to eliminate axial play.

The support tube is advantageously designed as a standard component in which the drive wheel with the end shield is preinstalled, as a separate assembly. To this end, a pot-shaped bearing receptacle is formed on one end of the support tube, which serves as the first bearing surface for the drive element. The material deformation takes place on the opposite end of the support tube with the larger diameter, i.e., the end to which the inserted end shield is fixed in position.

The inventive manufacturing method as recited in independent claim 13 has the advantage that the caulking of the jacket tube for creating a form-fit connection with the end shield is decoupled from the action of the holding force on the end shield. As a result, axial play may be reliably prevented, independently of the manufacturing tolerances of the individual components.

Due to the caulking process, the process of fixing the bearing in position may be adapted very flexibly, and without additional effort, to different strength requirements and different axial forces. This may be controlled very easily, e.g., via the radial feed of the stamping tool, thereby resulting in an undercut of a varying size for the axial support of the end shield.

The inventive manufacturing method may also be used with a design of a support tube with a reinforcing base surface in which an installation opening is formed. After the end shield and the drive wheel have been installed in the support tube, a contact pressure may be applied to the end shield through the installation opening in order to eliminate the bearing play. After the jacket wall of the support tube is caulked radially, the end shield is fixed securely in position. The contact pressure applied during installation may therefore be removed.

BRIEF DESCRIPTION OF THE DRAWINGS

Various exemplary embodiments of an inventive transmission drive unit are presented in the drawing, and they are described in greater detail in the description below.

DETAILED DESCRIPTION OF THE PREFERRED EMBODIMENTS

Figure 1:
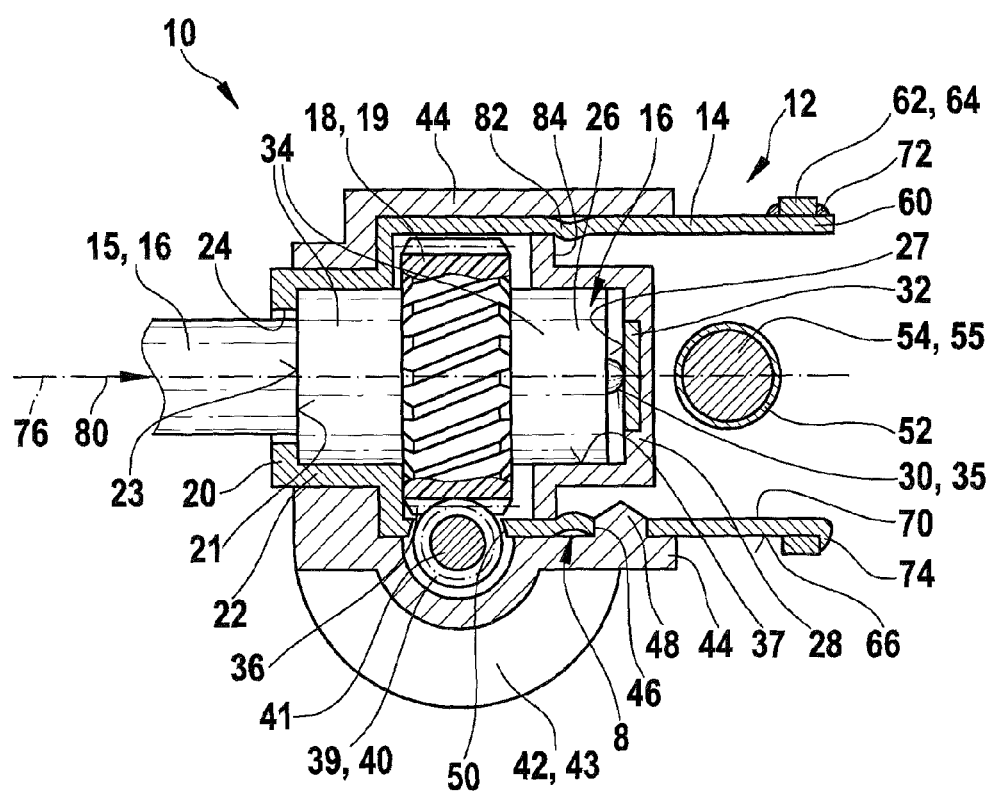
FIG. 1 shows a cross section through an inventive transmission drive unit.

Transmission drive unit 10 shown in FIG. 1 is composed of a first assembly 12, with which a shaft 15 designed as a spindle 16 with a drive element 18 located thereon is supported in a support tube 14, drive element 18 being designed as a wormwheel 19. Support tube 14 is manufactured, e.g., using deep drawing, and includes—on an end region 20—a pot-shaped bearing receptacle 22 for drive element 18. Spindle 16 extends out of support tube 14 through opening 24 in pot-shaped bearing receptacle 22 and is connected with body 99, e.g., via a counternut 98, which is not shown in FIG. 1. With this exemplary embodiment, the other spindle end 26 is located inside support tube 14 and is supported axially and radially via an end shield 28 that is attached inside support tube 14, to its inner wall 70. To this end, jacket regions 8 of support tube 14 are reshaped radially inwardly, so that the regions of material deformation 82 create a form-fit connection with radially extending back side 84 of end shield 28. As a result, end shield 28 is pressed against drive element 18, and drive element 18 is pressed against bearing receptacle 22 of support tube 14, thereby suppressing the longitudinal axial play of drive element 18. Spindle end 26 includes, e.g., a spherical stop surface 30, which rests axially against pot-shaped end shield 28. Optionally, a stiffer thrust washer 32 may be located in end shield 28. Drive element 18 is designed as wormwheel 19 that includes axial projections 34 for radial support. Axial projections 34 rest on a cylindrical jacket surface 37 of end shield 28. Drive element 18 is injection-molded using plastic directly onto spindle 16 and includes toothing 36 that meshes with a driven element 40 of a drive assembly 42. Drive assembly 42 is designed as an electric motor 43 and is connected with first assembly 12 using a coupling device 44. Support tube 14 has a projection 46, which is used to position support tube 14 relative to coupling device 44, and into which a fixing element 48 of coupling device 44 engages. To transfer the torque from drive assembly 42 to separate assembly 12, support tube 14 has a radial recess 50 into which driven element 40 engages. Driven element 40 is designed, e.g., as worm 39, which is located on an armature shaft 41 of electric motor 43.

Support tube 14, which serves as a housing for separate assembly 12, also includes a receptacle 52 into which a fastening device 54, e.g., a pivot bolt 55, may be slid. With this fastening device 54, support tube 14 is connected—e.g., in a hinged manner—with an adjusting part 58 in the motor vehicle, e.g., a not-shown seat or a seat part that is adjusted relative to another seat part. A support element 62 is attached to support tube 14 between receptacle 52 and an end 60 of support tube 14 located closer thereto. Support element 62 is designed as outer ring 64, which rests in an outer circumferential surface 66 of support tube 14. In the top half of the drawing, support element 62 is connected with support tube 14, e.g., via welds 72. The lower half of the drawing shows an attachment of support element 62 using caulking 74 via plastic deformation. If an accident occurs, high material stressing occurs between receptacle 52 and end 60 of support tube 14. These strong forces are absorbed by support element 62, which therefore increases the absorption of force by support tube 14 without it being destroyed. As a result, spindle end 26 and, therefore, part 58 to be adjusted, remain in their intended places when a crash occurs.

If, during an adjusting procedure in axial direction 76, a compression force 80 acts on spindle 16, shaft 15 is supported via drive element 18 in pot-shaped bearing receptacle 22 of end shield 28. Compression force 80 is transferred via end shield 28 to material deformation 82 and, therefore, to support tube 14, which, in turn, bears against fastening device 54.

Figure 2:
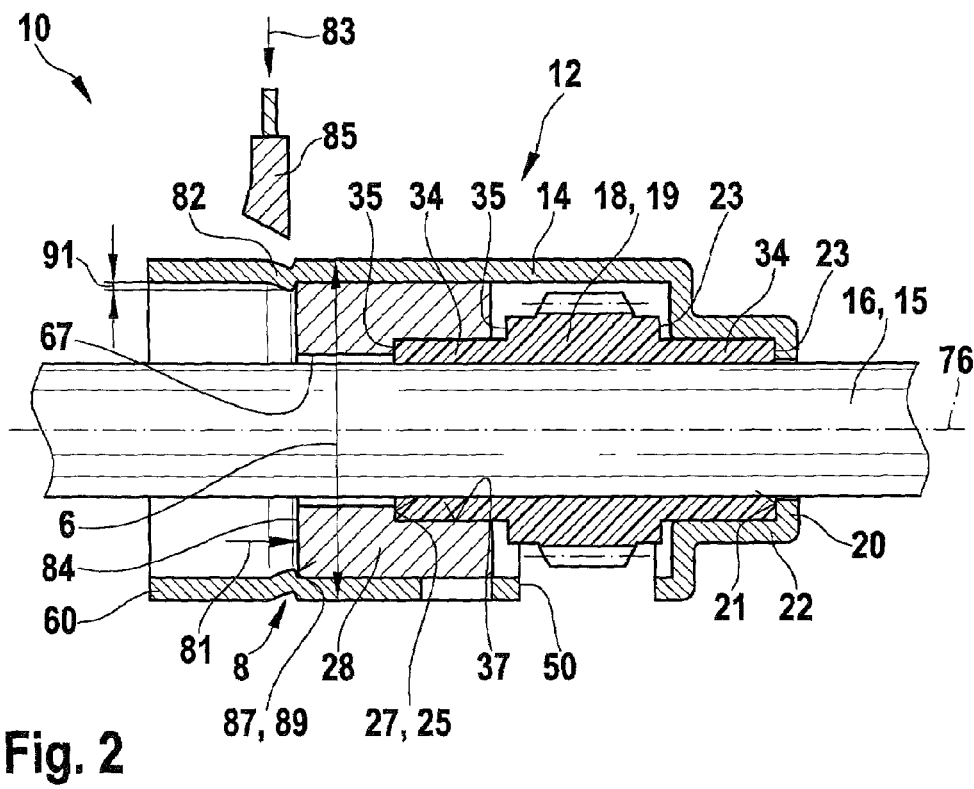
FIGS. 2 and 3 show cross sections and views of a further exemplary embodiment.
Figure 3:
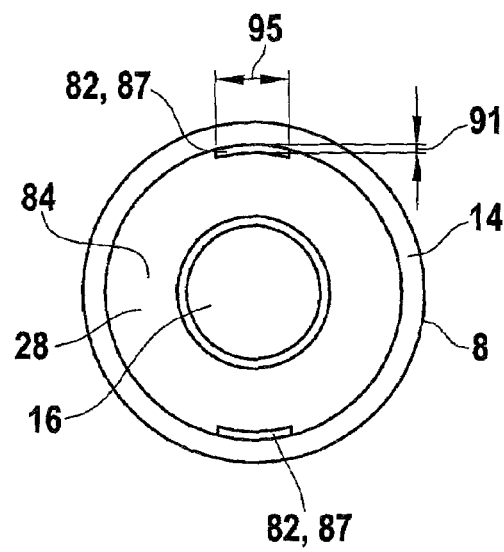

A further exemplary embodiment is shown in FIGS. 2 and 3, with which a wormwheel 19 supported on a through-extending spindle 16 is formed, as drive element 18. Shaft 15, which is designed as spindle 16, is located along an axis 76. As in FIG. 1, support tube 14 includes a pot-shaped bearing receptacle 22 with a first axial bearing surface 21, against which drive element 18 rests via a first axial stop 23. Second end shield 28 is designed as a sleeve with a circumferential collar 25, which serves as second axial bearing surface 27 for a second stop 35 of drive element 18. Drive element 18 and end shield 28 are installed in support tube 14, then end shield 28 is fixed in position in support tube 14 such that the axial bearing play of drive element 18 is suppressed. To this end, sleeve-shaped end shield 28 is pressed with a predefined contact pressure 81 against drive element 18 and first bearing surface 21. Jacket regions 8 of support tube 14 are then pressed radially inward using a stamping tool 85, thereby producing an undercut 87, which rests axially via an axial end face 89 against end shield 28. Depending on the caulking force 83 applied by stamping tool 85, end face 89 has a certain radial depth 91 and a certain breadth 95 around the circumference of support tube 14. By specifying the depth 91 and breadth 95 of end face 89, and the number of material deformations 82, transmission drive unit 10 may be adapted to maximum axial forces 80 that may be expected. End shield 28 includes a central opening 67, through which spindle 16 extends. End shield 28 bears radially via its entire axial extension against inner wall 70 and includes an annular back side 84. End face 89 of undercut 87 forms a form-fit connection with back side 84, which is oriented nearly perpendicularly to shaft 15. Drive element 18 is fixed securely in position axially in support tube 14 via the form-fit connection.

Figure 4:
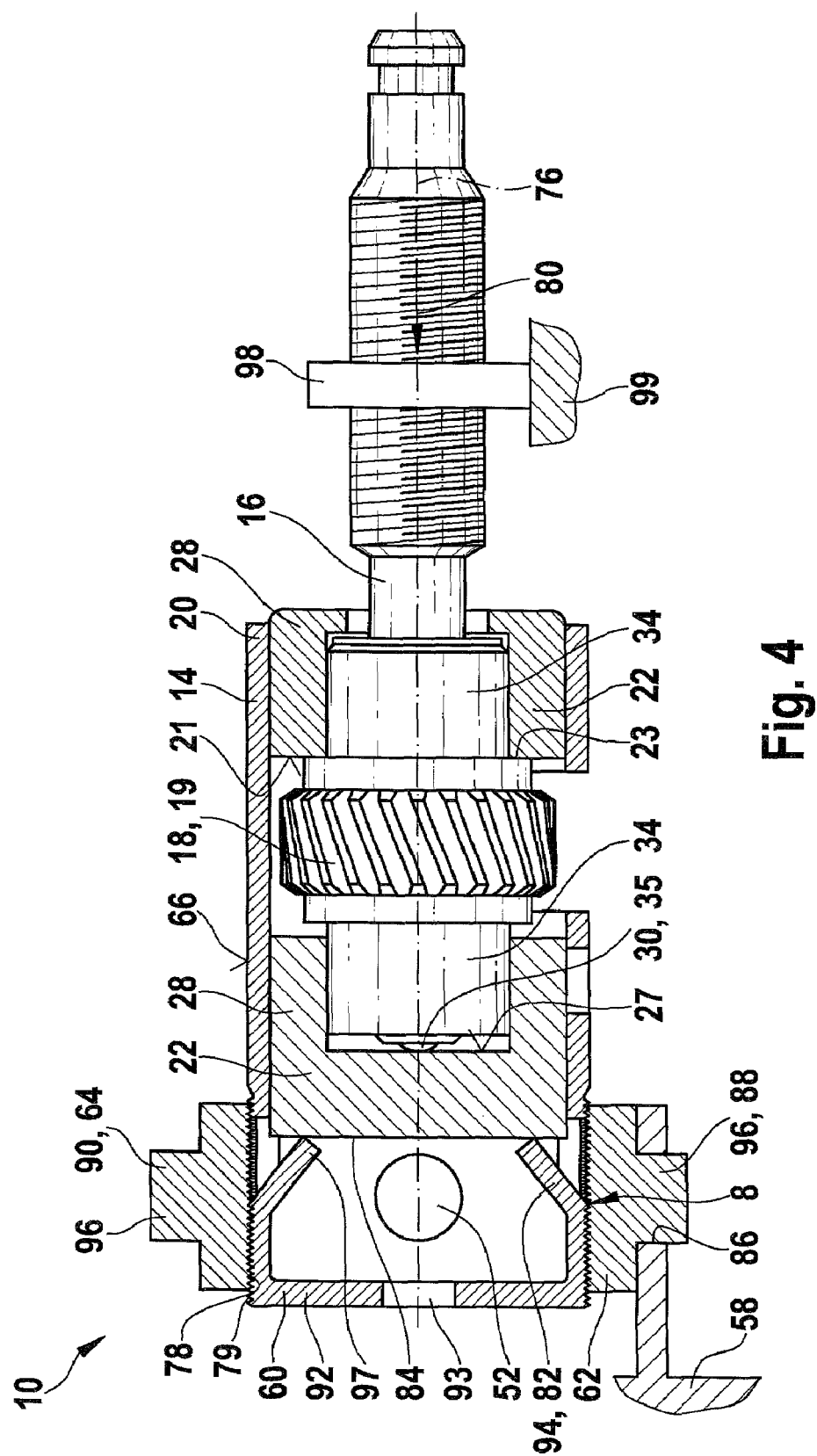
FIG. 4 shows a cross section of a further inventive spindle drive.

FIG. 4 shows a further exemplary embodiment of an inventive transmission drive unit 10, with which support tube 14 includes a largely closed base surface 92 at one end 60. An installation opening 93 is formed in base surface 92, to simplify the secure support of spindle 16 in end shield 28. To this end, end shield 28 is preinstalled with second integrally formed, axial bearing surface 27 and drive element 18 in support tube 14. With this embodiment, a second separate end shield 28 with a pot-shaped bearing receptacle 22 is located in support tube 14 on end 20 at which spindle 16 extends out of support tube 14. End shield 28 serves as first bearing surface 21. First bearing surface 21 is fixed securely in position axially in the support tube via end shield 28. To eliminate the axial bearing play, end shield 28 with second axial bearing surface 27 is now pressed axially against drive element 18—which bears against first bearing surface 21—with a preload force 81. Preload force 81 is introduced to end shield 28 through installation opening 93. Jacket regions 8 of support tube 14 are now pressed radially inward, resulting in the formation of securing tabs 94 with a free end 97. Securing tabs 94 bear axially against back side 84 of end shield 28. Via material deformation 82, end shield 28 is pressed axially and tightly against second stop 35 of drive wheel 18, thereby eliminating its play.

A receptacle 52 designed as a radial bore is integrally formed directly in support tube 14 for an attachment device 54. Receptacle 52 is a standard interface for the customer, although it may be modified using a receiving module 90 to be a customer-specific, individual receptacle 88. To this end, receiving module 90 is designed as outer ring 64, which is located on outer circumferential surface 66 of support tube 14. Receiving module 90 includes, e.g., an inner thread 78, which engages in counter-thread 79—designed as an outer thread—of support tube 14. Receiving module 90 covers the radial cut-outs formed via receptacle 52 and caulking tabs 94. With this embodiment, receiving module 90 also serves as support element 62, which increases the strength of support tube 14 at its end region 60. Receiving module 90 includes a cylindrical bolt 96 as receptacle 88, which extends radially outwardly. Cylindrical bolt 96 corresponds to an integration of pivot bolt 55—designed as fastening device 54—in FIG. 1. With receptacle 88, part 58 to be adjusted may be connected via eyes 86 integrally formed therein with spindle drive 10, e.g., directly. Via receiving module 90, the crash forces are reliably transferred from adjusting part 58 to support tube 14 and via spindle 16 and counternut 98 to body 99.

It should be noted that, with regard for the exemplary embodiments presented in the figures and the description, many different combinations of the individual features are possible. For example, support tube 14 may be manufactured using different methods, and it may have different specific designs. The cross section of support tube 14 is not limited to a circle. Instead of being designed as an integrally formed, pot-shaped bearing receptacle 22, support tube 14 may also be designed as a smooth cylindrical tube in which two separate end shields 28 for supporting spindle 16 are located.

Spindle 16 is preferably supported via drive element 18 supported thereon, although, in one variation, it may also be supported via bearing surfaces that are integrally formed directly on spindle 16. The device used to transfer torque from drive assembly 42 is not limited to a worm gear 19, 39. Torque may also be transferred, e.g., using a spur gear. The specific shape and material used for material deformation 82 is selected depending on the strength requirement. One or more undercuts 87 or caulking tabs 94 may be pressed inward, as necessary. Likewise, the size of axial end face 89 may be selected for its depth 91 and breadth 95, thereby making it possible to predetermine the strength of the form-fit connection with radially extending back side 84 of end shield 28.

What is claimed is:

1. A transmission drive unit (10) for adjusting a movable part (58) in a motor vehicle, comprising:
   a drive assembly (42);
   a support tube (14);
   a drive element (18), wherein said drive element (18) is drivable by the drive assembly (42) and is rotatably supported in the support tube (14) via at least one end shield (28), the drive element (18) including a first axial stop (23), which bears against a first axial support surface (21) of the support tube (14), and the drive element (18) including a second axial stop (35), which rests against a second axial support surface (27) of the end shield (28), the end shield (28) being pressed against the second axial stop (35) of the drive element (18) via a material deformation of the support tube (14);
   a shaft (15) formed as a spindle (16) disposed in the support tube (14);
   a drive element (18) mounted on said shaft, wherein said drive element (18) is formed as a worm gear (19), wherein the material deformation (82) is formed by radially inwardly formed jacket regions (8) of the support tube (14), wherein the spindle (16) with the support tube forms a separate assembly independent of a transmission housing, and wherein the support tube (14) has a radial recess (50), wherein a driven element (40) engages in said radial recess (50) for transmission of torque.

2. The transmission drive unit (10) as recited in claim 1, wherein the jacket regions (8) are located in the region of a maximum diameter (6) of the support tube (14).

3. The transmission drive unit (10) as recited in claim 1, wherein the drive element (18) bears against the end shield (28) at a point on the tip of a ball (30).

4. The transmission drive unit (10) as recited in claim 1, wherein the end shield (28) includes an inner cylindrical jacket surface (37) that radially supports the drive element (18).

5. The transmission drive unit (10) as recited in claim 1, wherein the end shield (28) includes a thrust washer (32) that is composed of a harder material than the end shield (28) is.

6. The transmission drive unit (10) as recited in claim 1, wherein the first axial support surface (21) of the support tube (14) is a pot-shaped bearing receptacle (22) with an axial opening (24) for the shaft (15), the bearing receptacle (22) being integrally formed as a single piece with the support tube (14) using a deep-drawing method.

* * * * *